(12) United States Patent
Jacoby et al.

(10) Patent No.: US 11,893,459 B1
(45) Date of Patent: Feb. 6, 2024

(54) ARTIFICIAL INTELLIGENCE LABELING PLATFORM FOR SECURE DATA INCLUDING OBSERVATION VALIDATION

(71) Applicant: Change Healthcare Holdings LLC, Nashville, TN (US)

(72) Inventors: Christopher Jacoby, Oakland, CA (US); Thomas Chase Corcoran, San Jose, CA (US); Adrian Lam, South Francisco, CA (US)

(73) Assignee: CHANGE HEALTHCARE HOLDINGS LLC, Nashville, TN (US)

( * ) Notice: Subject to any disclaimer, the term of this patent is extended or adjusted under 35 U.S.C. 154(b) by 665 days.

(21) Appl. No.: 17/030,881

(22) Filed: Sep. 24, 2020

(51) Int. Cl.
| | |
|---|---|
| *G06N 20/00* | (2019.01) |
| *G06F 16/28* | (2019.01) |
| *G06F 21/62* | (2013.01) |
| *G06F 21/30* | (2013.01) |
| *G06F 16/23* | (2019.01) |
| *G06N 5/04* | (2023.01) |
| *G06F 16/22* | (2019.01) |

(52) U.S. Cl.
CPC ......... *G06N 20/00* (2019.01); *G06F 16/2228* (2019.01); *G06F 16/2379* (2019.01); *G06F 16/285* (2019.01); *G06F 21/30* (2013.01); *G06F 21/6245* (2013.01); *G06N 5/04* (2013.01)

(58) Field of Classification Search
CPC ...... G06N 20/00; G06N 5/04; G06F 16/2379; G06F 16/285; G06F 16/2228; G06F 21/30; G06F 21/6245
See application file for complete search history.

(56) References Cited

U.S. PATENT DOCUMENTS

| | | | |
|---|---|---|---|
| 11,481,650 B2 * | 10/2022 | Bugakova | G06N 5/04 |
| 11,527,019 B2 * | 12/2022 | Staudigl | G06N 20/20 |
| 11,556,579 B1 * | 1/2023 | Bhatia | G06F 16/367 |
| 11,599,666 B2 * | 3/2023 | Nayak | G06F 16/35 |
| 2008/0027913 A1 * | 1/2008 | Chang | G06F 16/00 |
| 2017/0270164 A1 * | 9/2017 | Berger | G06F 16/24553 |

* cited by examiner

*Primary Examiner* — Michael I Ezewoko
(74) *Attorney, Agent, or Firm* — Myers Bigel, P.A.

(57) ABSTRACT

A method includes identifying records in a database for labeling; presenting one of the records in the database to a first labeling entity; and receiving a first observation on an information source in the one of the records from the first labeling entity. The first observation has one of a plurality of observation types associated therewith. The plurality of observation types including a validation observation type in which the first observation comprises a confirmation of whether a second observation on the information source in the one of the records from another labeling entity is accurate and an edit for the second observation when the second observation is confirmed as inaccurate. The one of the records is updated in the database with the first observation on the information source in the one of the records from the first labeling entity.

20 Claims, 7 Drawing Sheets

```
mysql/rdbms
record_id, bounding_box, bounding_box_type, annotator_id
1      | [0,0,0,0] | car      | labler_1
1      | [0,0,0,1] | car      | labler_2
1      | [0,0,1,1] | stopsign | labler_1
2      | [0,0,1,1] | stopsign | labler_1
2      | [0,0,1,1] | car      | labler_2 record_id, classification_label, annotator_id
1      | has_person    | labler_1
1      | has_crosswalk | labler_2
```

FIG. 7

```
mongodb/nosql database

{
    "record_id"  1
    "data" : [
        {
            "boundingbox"· [0,0,0,0],
            "boundingbox_type"  car,
            "user_id": labler_1
        },
        {
            "boundingbox": [0,0,0,0],
            "boundingbox_type"· stopsign,
            "user_id"· labler_2
        },
        {
            "classication": "has_crosswalk",
            "user_id"· labler_2
        },

ARTIFICIAL INTELLIGENCE LABELING PLATFORM FOR SECURE DATA INCLUDING OBSERVATION VALIDATION

FIELD

The present inventive concepts relate generally to health care systems and services and, more particularly, to labeling of data to train Artificial Intelligence (AI) systems.

BACKGROUND

Artificial Intelligence (AI) systems may be designed to emulate the problem solving skills of the human brain. AI systems may be trained by providing them with large amounts of data. There are generally two types of training approaches: supervised learning and unsupervised learning. In the supervised learning approach, humans transfer their knowledge to the dataset through the use of labels. By labeling the input data along with the possible outcomes the AI system can essentially learn over time as it sees more examples and makes corrections when it predicts or answers wrong. In the unsupervised learning approach, the data is unlabeled; therefore, there is no sample dataset with known answers by which the AI system can learn. Instead, the AI system looks for patterns in the data and attempts to correlate these patterns with things to predict or detect. In supervised learning, humans are typically presented with unlabeled data to annotate and this labeled data may be used to train and implement an AI engine, which implements an AI model. Many labeling platforms, however, do not take into account the nature of the data being labeled. Which may be problematic in developing AI systems to serve certain industries, for example, health care, financial, government, which may require certain protections or security protocols be enforced when granting access to the data. In addition, persons performing the labeling may create ambiguous labels, which may be difficult to resolve resulting in some labeled data being discarded.

SUMMARY

According to some embodiments of the inventive concept, a method comprises identifying records in a database for labeling; presenting one of the records in the database to a first labeling entity; receiving a first observation on an information source in the one of the records from the first labeling entity, the first observation having one of a plurality of observation types associated therewith, the plurality of observation types comprising a validation observation type in which the first observation comprises a confirmation of whether a second observation on the information source in the one of the records from another labeling entity is accurate and an edit for the second observation when the second observation is confirmed as inaccurate; and updating the one of the records in the database with the first observation on the information source.

In other embodiments, identifying the records in the database for labeling comprises prioritizing the records in the database for labeling. Presenting the one of the records in the database to the first labeling entity comprises presenting the one of the records in the database to the first labeling entity based on a priority of the one of the records in the database.

In still other embodiments, the plurality of observation types further comprises a bounding box observation type, a text highlight observation type, a classification observation type, a free text transcription observation type, and/or a meta-information observation type.

In still other embodiments, the one of the records comprises data, the information source corresponding to at least a portion of the data in the one of the records; the data is associated with a regulatory constraint of a governmental administrative authority. Presenting the one of the records in the database to the first labeling entity comprises verifying that the first labeling entity is authorized to view the one of the records in the database.

In still other embodiments, the data comprises Protected Health Information (PHI) and the regulatory constraint comprises the Health Insurance Portability and Accountability Act (HIPAA).

In still other embodiments, the database is an unstructured database.

In still other embodiments, the database is a NoSQL database or a UnSQL database and the records are in a JavaScript Object Notation (JSON) format.

In still other embodiments, the labeling entity is a person.

In still other embodiments, the labeling entity is a plurality of persons.

In still other embodiments, the method further comprises generating, using a machine learning engine and the one of the records in the database that has been updated, an artificial intelligence engine.

In still other embodiments, the one of the records in the database is a first one of the records in the database. The method further comprises evaluating an accuracy of the artificial intelligence engine; prioritizing the records in the database for labeling based on the accuracy of the artificial intelligence engine; and presenting a second one of the records in the database to the first labeling entity based on a priority of the second one of the records in the database.

In still other embodiments, generating the artificial intelligence engine comprises aggregating the first observation on the information source in the one of the records from the first labeling entity with a second observation on the information source in the one of the records from a second labeling entity to generate a training record including an aggregated observation for the information source; and generating, using the machine language learning engine and the training record, the artificial intelligence engine. Aggregating the first observation on the information source with the second observation on the information comprises weighting the first observation and the second observation based on identities of the first labeling entity and the second labeling entity, respectively.

In some embodiments of the inventive concept, a system comprises a processor; and a memory coupled to the processor and comprising computer readable program code embodied in the memory that is executable by the processor to perform operations comprising: identifying records in a database for labeling; presenting one of the records in the database to a first labeling entity; receiving a first observation on an information source in the one of the records from the first labeling entity, the first observation having one of a plurality of observation types associated therewith, the plurality of observation types comprising a validation observation type in which the first observation comprises a confirmation of whether a second observation on the information source in the one of the records from another labeling entity is accurate and an edit for the second observation when the second observation is confirmed as inaccurate; and updating the one of the records in the database with the first observation on the information source.

In further embodiments, the plurality of observation types further comprises a bounding box observation type, a text highlight observation type, a classification observation type, a free text transcription observation type, and/or a meta-information observation type.

In still further embodiments, the one of the records comprises data, the information source corresponding to at least a portion of the data in the one of the records; the data is associated with a regulatory constraint of a governmental administrative authority. Presenting the one of the records in the database to the first labeling entity comprises verifying that the first labeling entity is authorized to view the one of the records in the database.

In still further embodiments, the operations further comprise generating, using a machine learning engine and the one of the records in the database that has been updated, an artificial intelligence engine.

In some embodiments of the inventive concept, a computer program product comprises a non-transitory computer readable storage medium comprising computer readable program code embodied in the medium that is executable by a processor to perform operations comprising: identifying records in a database for labeling; presenting one of the records in the database to a first labeling entity; receiving a first observation on an information source in the one of the records from the first labeling entity, the first observation having one of a plurality of observation types associated therewith, the plurality of observation types comprising a validation observation type in which the first observation comprises a confirmation of whether a second observation on the information source in the one of the records from another labeling entity is accurate and an edit for the second observation when the second observation is confirmed as inaccurate; and updating the one of the records in the database with the first observation on the information source.

In other embodiments, the plurality of observation types further comprises a bounding box observation type, a text highlight observation type, a classification observation type, a free text transcription observation type, and/or a meta-information observation type.

In still other embodiments, the one of the records comprises data, the information source corresponding to at least a portion of the data in the one of the records; the data is associated with a regulatory constraint of a governmental administrative authority. Presenting the one of the records in the database to the first labeling entity comprises verifying that the first labeling entity is authorized to view the one of the records in the database.

In still other embodiments, the operations further comprise generating, using a machine learning engine and the one of the records in the database that has been updated, an artificial intelligence engine.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which:

FIGS. 7 and 8 are examples of different database models for storing labeled data according to some embodiments of the inventive concept;

DETAILED DESCRIPTION

Figure 1:
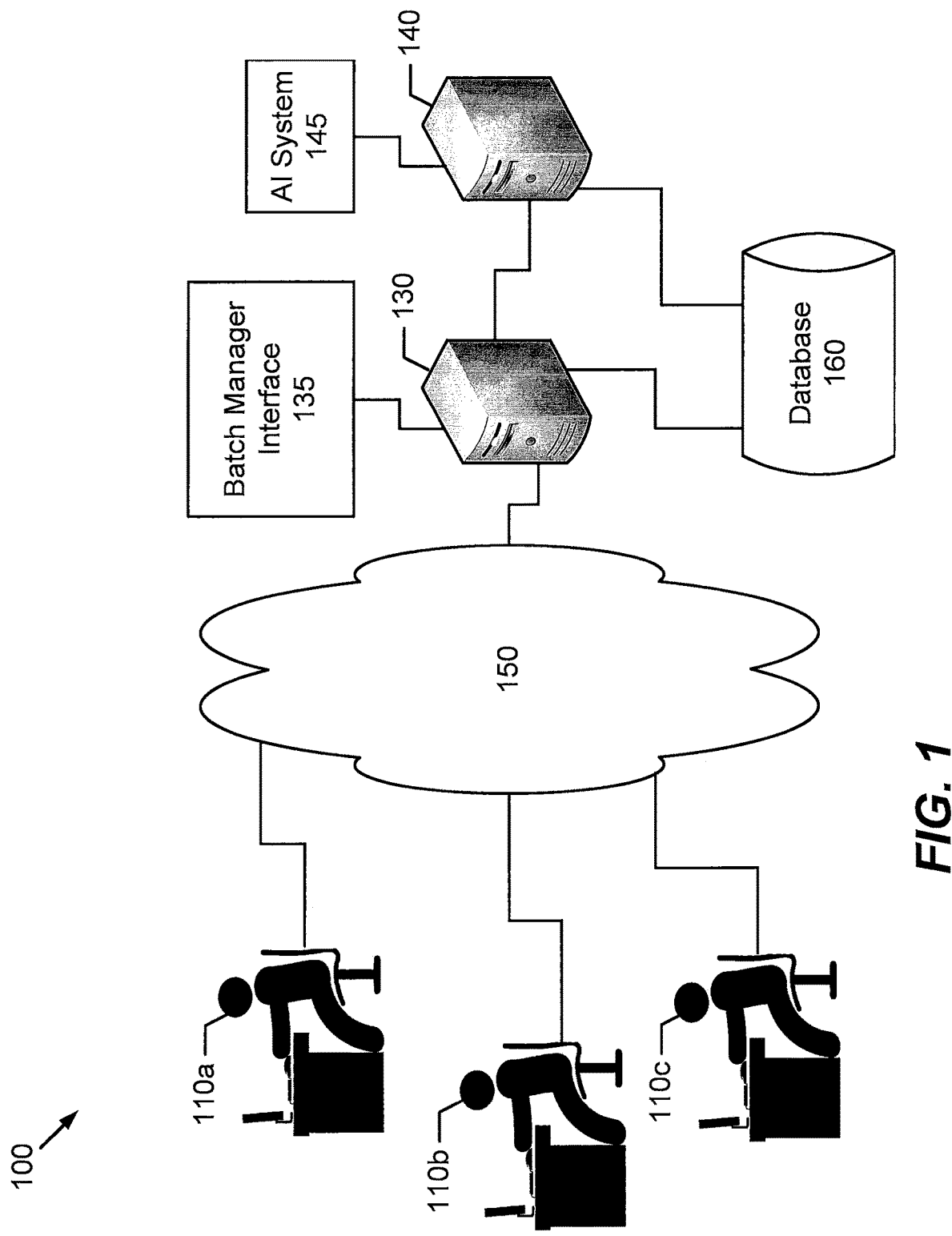
FIG. 1 is a block diagram that illustrates a communication network including an Artificial Intelligence (AI) labeling platform in accordance with some embodiments of the inventive concept.

In the following detailed description, numerous specific details are set forth to provide a thorough understanding of embodiments of the present inventive concept. However, it will be understood by those skilled in the art that the present invention may be practiced without these specific details. In some instances, well-known methods, procedures, components and circuits have not been described in detail so as not to obscure the present inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the inventive concept are described herein in the context of a labeling platform for use in supervised training of an Artificial Intelligence (AI) system that includes a machine learning engine and an AI engine. It will be understood that embodiments of the inventive concept are not limited to a machine learning implementation of the AI systems as other implementations may be used including, but not limited to, a multi-layer neural network, a deep learning system, a natural language processing system, and/or computer vision system. Moreover, it will be understood that the multi-layer neural network is a multi-layer artificial neural network comprising artificial neurons or nodes and does not include a biological neural network comprising real biological neurons.

Some embodiments of the inventive concept stem from a realization that traditional labeling platforms do not have mechanisms in place to enforce security protocols when labeling sensitive data, such as health records, financial records, and the like. In addition, persons performing the labeling may sometimes create ambiguous labels that may not be suitable for training the AI system. Without an ability to resolve the ambiguity, these labeled data may be discarded. Embodiments of the inventive concept may provide a labeling platform in which a labeling entity (e.g., a person) may be tasked to validate a previously labeled data item by indicating whether the data item was labeled correctly or incorrectly. Depending on the level of ambiguity, one or more confirmations may be obtained before accepting the data item as properly labeled. In some embodiments, a first labeling entity (e.g., a first person) may indicate that a second labeling entity's label is inaccurate and may provide an edit to the second labeling entity's label to correct any inaccuracy. For example, in some instances, a label may be correct in most aspects, but may have a single incorrect word or the boundary on one side of a bounding box may be slightly misplaced. The edit provided by the validating labeling entity may allow the label generated by the originating labeling entity to be corrected rather than discarded or using processing resources to reconcile it with the labels of other labeling entities for the same source subject matter. To ensure that the data being labeled is not improperly handled risking the potential for civil or criminal liability, when the data is associated with a regulatory constraint of a governmental administrative authority, then the entities (e.g., persons) performing the labeling may have their authorization to view the data verified before they are allowed to being the labeling process. For example, Protected Health Information (PHI) data are protected by the Health Insurance Portability and Accountability (HIPAA) act. Before any such PHI data are labeled, the labeling platform, according to some embodiments of the inventive concept, may verify through one or more security protocols that the individual(s) performing the labeling are authorized to view the PHI data.

To improve the efficacy of the labeling in training an AI system, the records in the database can be prioritized based on the accuracy of the AI system's predictions or answers. Those data items associated with subject matter areas in which the AI system is highly accurate may be assigned a low priority in labeling in favor of labeling data items associated with subject matter areas in which the AI system is less accurate and may need additional training.

The data records may be stored in a database using a variety of different database types including structured databases, such as a relational database (e.g., SQL), and unstructured databases (e.g., NoSQL or UnSQL). An unstructured database may use a database design that supports a variety of different data relationships, such as key-value pairs, graphs, documents, etc. Unstructured databases are often used to store large sets of distributed data. An unstructured database, such as NoSQL or UnSQL may allow all label observations or annotations to be stored together for a record. By contrast, a relational database, such as SQL, may use a different table for each type of annotation or observation with annotations or observations for multiple records being stored in the same table. As a result, to obtain all the annotations or observations for a single record, the tables are first merged and then sorted by record. Thus, according to some embodiments of the inventive concept, an unstructured database may be used to store the records for labeling to avoid the operations of merging tables and sorting rows by record if a structured database, such as SQL, were to be used.

Referring to FIG. 1, a communication network 100 including an AI labeling platform, in accordance with some embodiments of the inventive concept, comprises labeling entities 110*a*, 110*b*, and 110*c* that may use devices, such as computers, laptops, tables, mobile communication devices (e.g., smart phones), and the like, to label records for use in training an AI system. The labeling entities 110*a*, 110*b*, and 110*c* may each represent a single person or may each represent multiple persons. For example, a labeling entity may be representative of a committee that works together in labeling records.

An AI system may provide an AI labeling platform through use of a batch manager interface server 130, which is communicatively coupled to an AI system server 140. Both the batch manager interface server 130 and the AI system server 140 are coupled to a database 160, which contains the records to be labeled. The batch manager interface server 130 may include a batch manager interface module 135 that is configured to securely present or provide records from the database to the labeling entities 110*a*, 110*b*, and 110*c* for labeling. In some embodiments of the inventive concept, the batch manager interface module 135 may provide a secure Web application that is configured to implement any security protocols associated with restricting access to the records in the database. For example, the handling of certain types of data may be controlled by a regulatory constraint of a governmental administrative authority. One such example is PHI data, which are protected by the HIPAA act. Thus, the batch manager interface module 135 may ensure that only those labelling entities 110*a*, 110*b*, and 110*c* that possess the proper security qualifications (e.g., security qualifications that comply with any governmental regulatory constraint or private security policy) are allowed to view and label the data contained in the records stored in the database 160. In addition to the labeling entities 110*a*, 110*b*, and 110*c*, the batch manager interface module 135 may further protect the database 160 with an electronic security access wall to ensure that the database records 160 are not exposed to any entity that is not authorized to access or view the information contained therein.

The batch manager interface module 135 may present one or more records to each of the labeling entities 110*a*, 110*b*, and 110*c* in the form of a task list. Each task may link to a batch of records to be processed by the labeling entity 110*a*, 110*b*, and 110*c*. A task may represent a particular labeling operation, which is called an observation. For example, an observation is a statement about an information source in a record by a labeling entity 110*a*, 110*b*, and 110*c*. An information source may be, for example, an image or text stored in the record. Thus, a task may be a request to a labeling entity 110*a*, 110*b*, and 110*c* to perform an action such as "identify the location of all the tables in this image", which the labeling entity 110*a*, 110*b*, and 110*c* may respond to with an observation by drawing a bounding box on each table in the image. Other task examples include "what kind of dog does this image show?", which the labeling entity 110*a*, 110*b*, and 110*c* may respond to with selecting one dog breed option from a list; "where does the white blood cell count value occur on this page?," which the labeling entity 110*a*, 110*b*, and 110*c* may respond to with a bounding box around the white blood cell count value; "what is the text at this location in the image?", which the labeling entity 110*a*, 110*b*, and 110*c* may respond to by writing in the highlighted text. The batch manager interface module 135 may provide the labeling entities 110*a*, 110*b*, and 110*c* with a variety of different observation types for performing tasks. These observation types may include, but are not limited to, a bounding box observation type, a text highlight observation type, a classification observation type, a free text transcription observation type, a validation observation type, and a meta-information observation type. The bounding box observation type allows the labeling entity 110a, 110b, and 110c to highlight a region on an image. Multiple bounding box types (e.g., classes) may be used to identify different objects in an image. The text highlight observation type allows the labeling entity 110a, 110b, and 110c to highlight a region of text in a portion of text. Multiple highlight types (e.g., classes) may be used to identity different object types in the text. The classification observation type allows the labeling entity 110a, 110b, and 110c to select one or more of a defined list of operations, which represent a property about an information source in a record. The free-text transcription type allows the labeling entity 110a, 110b, and 110c to type free text into a box, which may refer to an information source in the record or another observation rendered on the record. A validation observation type allows the labeling entity 110a, 110b, and 110c to confirm with a "Yes" or "No" response, for example, whether an observation rendered by another labeling entity on an information source is accurate. As some observations may be ambiguous and difficult to discern, use of the validation observation type may allow the observations for those records to be confirmed and retained for use in training the AI system as opposed to being discarded due to the ambiguity. In some embodiments, a "No" response may be supplemented with an edit that can be used to correct the other labeling entity's observation. As described above, a label may be correct in many aspects, but may have an error in one or more words, boundary line, or the like. Rather than discard the observation, the edit provided by the validating labeling entity may be used to correct the original observation to allow the edited observation to be used in training the AI system. The ability to edit the existing observation may reduce the number of labels being discarded for ambiguities and may reduce or eliminate the need to use processing resources to reconcile differing labels for the same source subject matter. A meta-information observation type allows the labeling entity 110a, 110b, and 110c to provide input outside of what the tasks schema intends. For example, a labeling entity 110a, 110b, and 110c may be asked by the task to draw a bounding box around a particular object, but the labeling entity 110a, 110b, and 110c may respond with a meta-information observation that the image is corrupt and no objects can be seen.

The batch manager interface module 135 is further configured to store the observations made on the information sources in the records database 160. The AI system server 140 may include an AI system module 145 that is configured to use the observations for the records in the database 160 to train an AI engine. As described above, the database 160 may be implemented in a variety of different ways in accordance with various embodiments of the inventive concept. For example, the database 160 may be implemented as a structured database, such as a relational database (e.g., SQL) or as an unstructured database (e.g., NoSQL or UnSQL). FIG. 7 is a pseudocode example of a structured database implementation in which two labeling entities "labeler_1" and "labler_2" have provided bounding box type observations on two different records to identify cars and stop signs. The two labeling entities have also classification type observations indicating that an information source in the first record has a person (labeler_1) and has a crosswalk (labeler 2). As a table is created for each task, the observations for a single record may be spread across multiple tables requiring the tables to merged and sorted by record identification to obtain all of the observations for a single record. FIG. 8 is pseudocode example of an unstructured database implementation, which may allow all observations for a single record to be grouped together even though spanning multiple task types. In the example of FIG. 8, bounding box type observations and classification type observations are grouped together without the need to merge tables and sort by record identification. In some embodiments, the records may be stored in the unstructured database implementation using the JavaScript Object Notation (JSON) format.

It will be understood that the division of functionality described herein between the AI system server 140/AI system module 145 and the batch manager interface server 130/batch manager interface module 135 is an example. Various functionality and capabilities can be moved between the AI system server 140/AI system module 145 and the batch manager interface server 130/batch manager interface module 135 in accordance with different embodiments of the inventive concept. Moreover, in some embodiments, the AI system server 140/AI system module 145 and the batch manager interface server 130/batch manager interface module 135 may be merged as a single logical and/or physical entity.

A network 150 couples the labeling entities 110a, 110b, and 110c to the batch manager interface server 130/batch manager interface module 135. The network 150 may be a global network, such as the Internet or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The AI labeling platform service provided through the AI system server 140/AI system module 145 and the batch manager interface server 130/batch manager interface module 135, in some embodiments, may be embodied as a cloud service. In some embodiments, the AI labeling platform service may be implemented as a Representational State Transfer Web Service (RESTful Web service).

Although FIG. 1 illustrates an example communication network including an AI labeling platform for secure data including an observation validation capability, it will be understood that embodiments of the inventive subject matter are not limited to such configurations, but are intended to encompass any configuration capable of carrying out the operations described herein.

Figure 2:
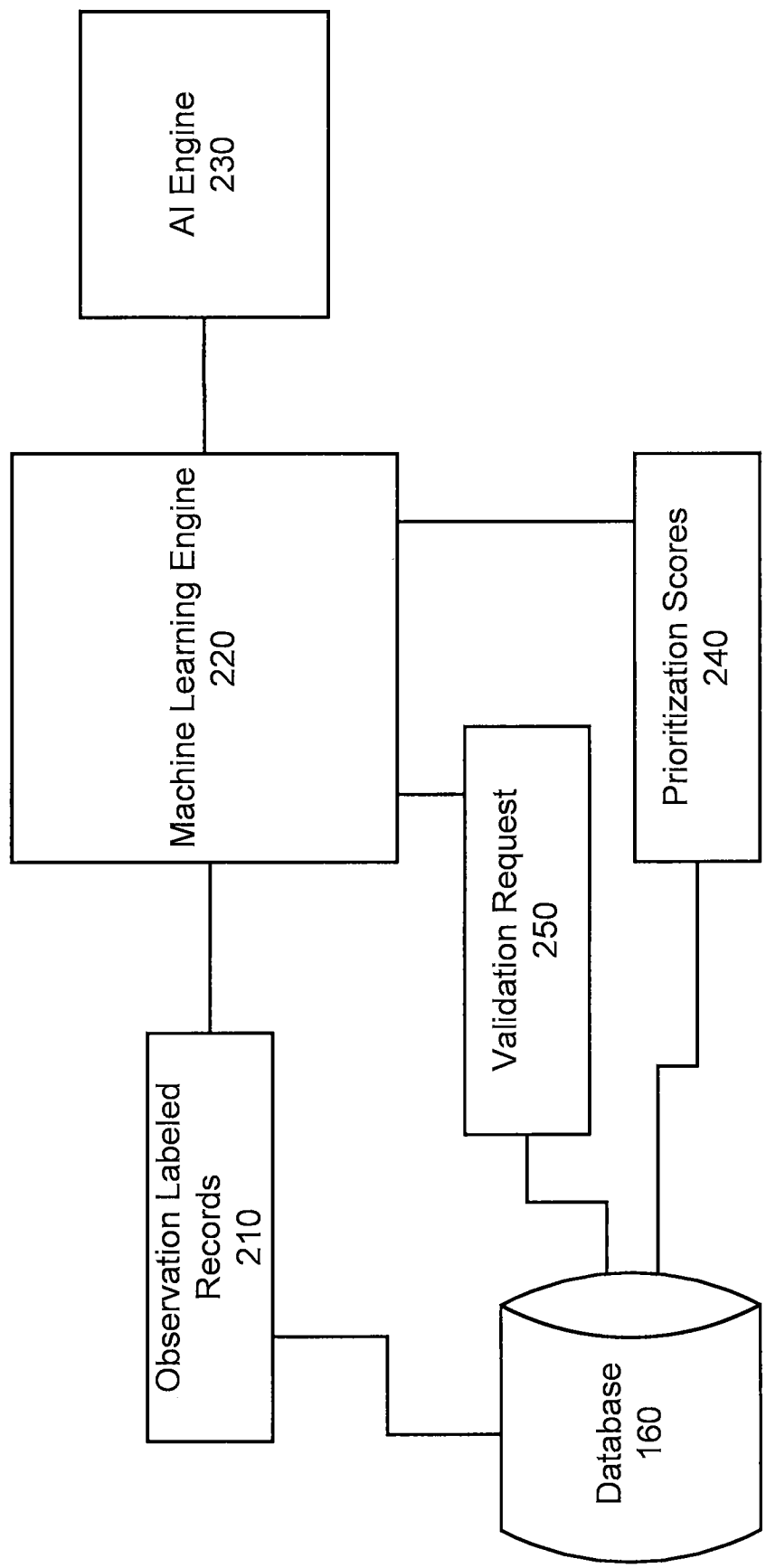
FIG. 2 is a block diagram of the AI labeling platform of FIG. 1 in accordance with some embodiments of the inventive concept.

FIG. 2 is a block diagram of the AI labeling platform of FIG. 1 in accordance with some embodiments of the inventive concept. As shown in FIG. 2, the AI system module 145 may comprise a machine learning engine 220 and an AI engine 230. The machine learning engine 220 may process records 210 from the database 160 that include observations provided from the labeling entities 110a, 110b, and 110c. The machine learning engine 220 may aggregate multiple observations for an information source of a record to obtain a consensus observation for the information source. The observation may then be considered as promoted to an annotation for the information source and the record may then be used as a training record that can be used to train the decision making used in the AI engine 230. The machine learning engine 220 may use regression techniques to evaluate the effects of various input data information sources on the generated outputs. These effects may then be used to tune and refine the quantitative relationship between the annotated data in the training records and the generated outputs. The tuned and refined quantitative relationship between the annotated information sources in the training records generated by the machine learning engine 220 is output for use in the AI engine 230. The machine learning engine 220 may be referred to as a machine learning algorithm. The AI engine 230 may, in effect, be generated by the machine learning engine 220 in the form of the quantitative relationship determined between the annotated data in the training records and the generated outputs (e.g., predictions, answers to questions, solutions to problems, etc.).

Over time as the machine learning engine 220 is trained on more observation labeled records 210, the accuracy of the AI engine 230 may improve, such that it performs better in solving some problems or tasks than others. As a result, some records in the database 160 may be more useful in training the machine learning engine 220 than others. The machine learning engine 220 may, therefore, assign prioritization scores 240 to the records in the database 160, such that records containing information sources associated with subject matter areas in which the AI engine 230 is highly accurate are assigned a lower priority while records containing information sources associated with subject matter areas in which the AI engine 230 is less may be assigned a higher priority. The batch manager interface module 135 may assign records in batches to the labeling entities 110a, 110b, and 110c based on the prioritization scores 240 assigned thereto.

As described above, some observations provided on information sources by labeling entities 110a, 110b, and 110c may be ambiguous and difficult to determine labeling entity's intent or if the labeling entity made a mistake in making an observation. The machine learning engine 220 may assign a validation request 250 to such a record so as to trigger the batch manager interface module 135 to assign the record to one or more other labeling entities 110a, 110b, and 110c with a task of providing a validation observation type response to confirm whether another labeling entity's 110a, 110b, and 110c observation is correct or incorrect and, in some embodiments, to provide an edit to correct the other labeling entity's 110a, 110b, and 110c observation if it is confirmed as incorrect. Depending on the level of ambiguity and/or importance of the information source, multiple other labeling entities 110a, 110b, and 110c may requested to validate an observation on an information source.

Figure 3:
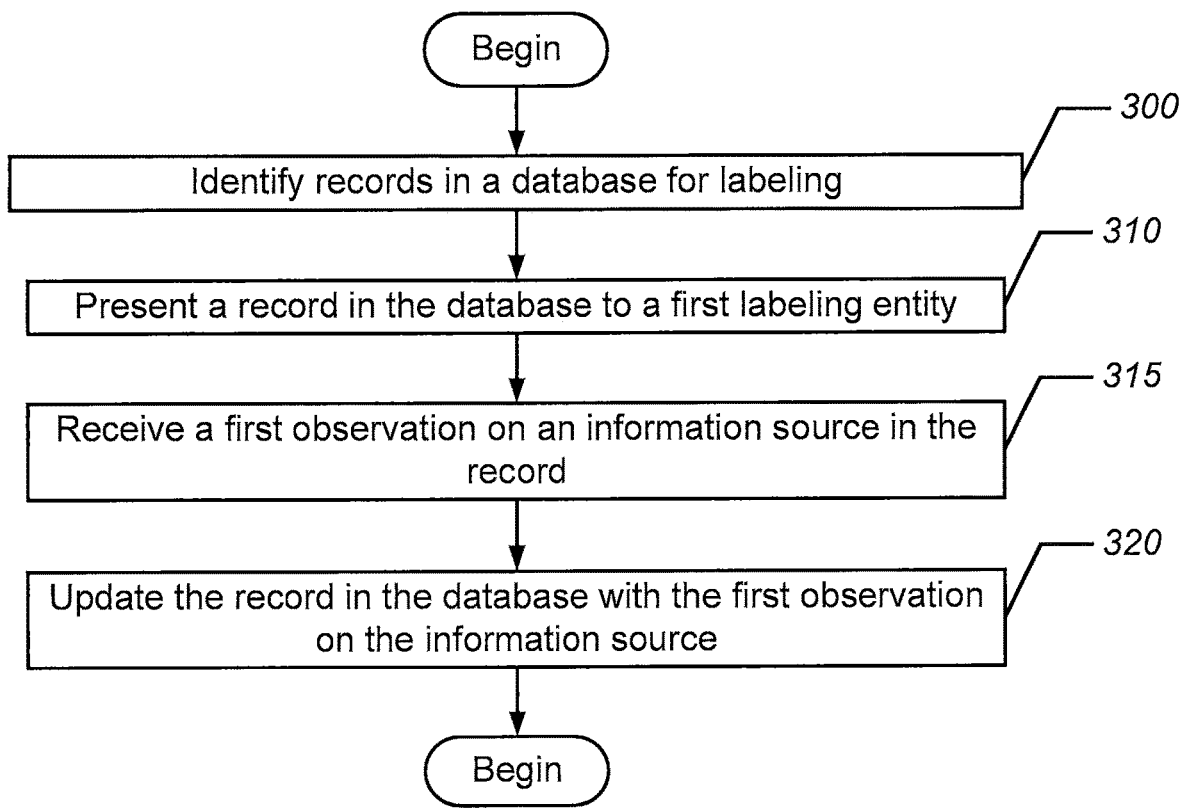
FIGS. 3-6 are flowcharts that illustrate operations of the AI labeling platform of FIGS. 1 and 2 in accordance with some embodiments of the inventive concept.

FIGS. 3-6 are flowcharts that illustrate operations of the AI labeling platform of FIGS. 1 and 2 in accordance with some embodiments of the inventive concept. Referring now to FIG. 3, operations begin at block 300 where the batch manager interface module 135 identifies records in the database 160 for labeling. The batch manager interface module 135 may group a set of records together into a batch and assign a task to the batch of records to be performed by one or more of the labeling entities 110a, 110b, and 110c. Thus, at block 310, a record with an associated task may be presented to a first one of the labeling entities 110a, 110b, and 110c. When the data contained in the records in the database 160 is of a sensitive nature that requires some level of security, e.g., the data is associated with a regulatory constraint of a governmental administrative authority or a private access policy, then the first one of the labeling entities 110a, 110b, and 110c may be required to verify that they are authorized to view or access the information contained in the records in the database 160 before a record will be provided for performing observations thereon. Once the first labeling entity has been verified, if necessary, as being authorized to access the record, a first observation may be received on an information source in the record from the first one of the labeling entities 110a, 110b, and 110c at block 315. As described above, the observation may be one of a plurality of observation types including a validation observation type, a bounding box observation type, a text highlight observation type, a classification observation type, a free text transcription observation type, and/or a meta-information observation type. The record may then be updated in the database 160 with the first observation on the information source provided by the first one of the labeling entities 110a, 110b, and 110c.

Figure 4:
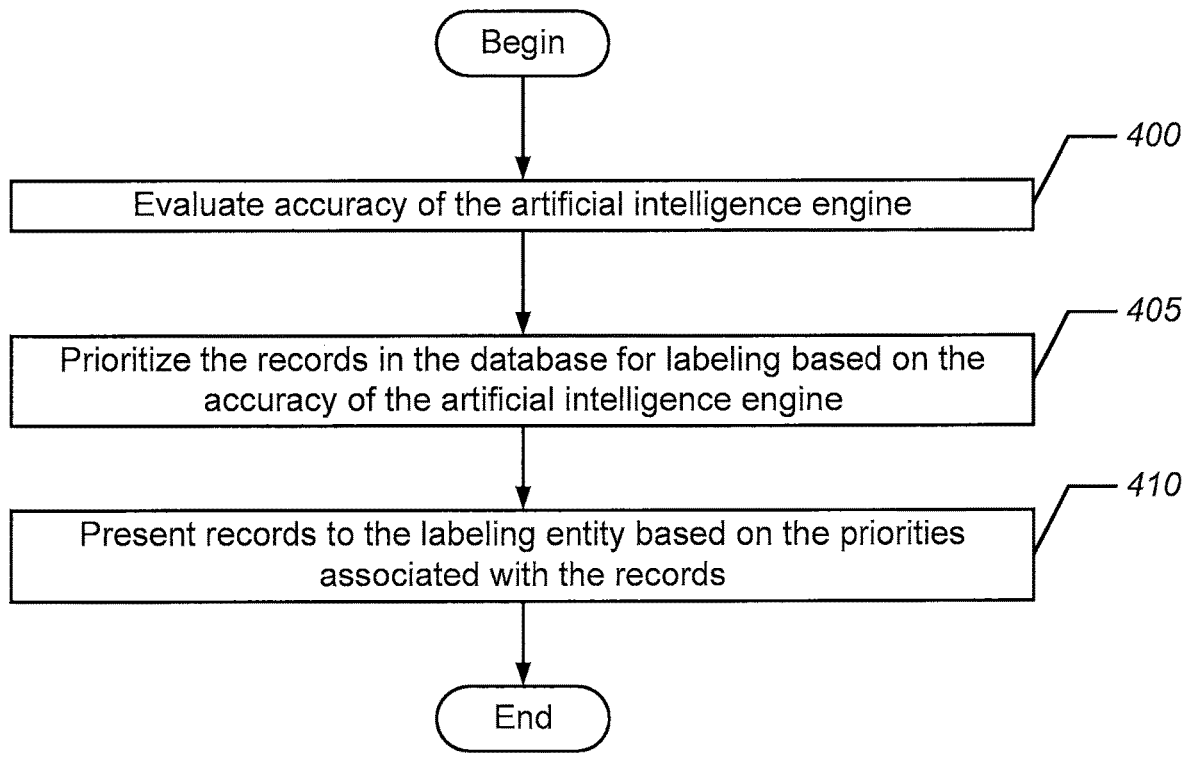

As described above, to train the AI engine 230 more efficiently, the records in the database 160 may be assigned to the labeling entities 110a, 110b, and 110c based on priority. Referring now to FIG. 4, operations begin at block 400 where the accuracy of the AI engine 230 may be evaluated. Records in the database 160 associated with the subject matter areas where the AI engine 230 is less accurate with its answers or predictions may be assigned a higher priority and those subject matter areas where the AI engine 230 is more accurate may be assigned a lower priority at block 405. The records may then be presented to a labelling entity 110a, 110b, and 110c based on the priorities associated with the records at block 410. This may provide the machine learning engine 220 with more observations on information sources associated with less accurate predictions or answers by the AI engine 230 allowing the machine learning engine 220 to increase its training in those areas and thereby improve the performance of the AI engine 230.

Figure 5:
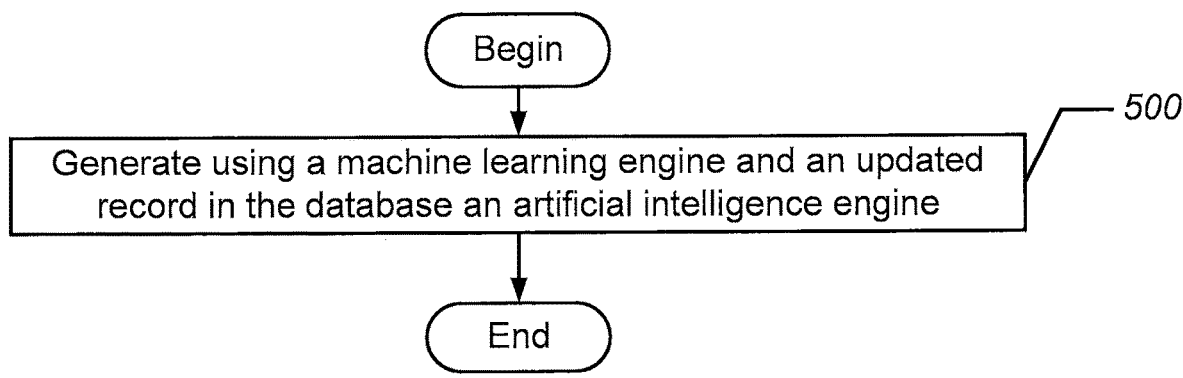
Figure 6:
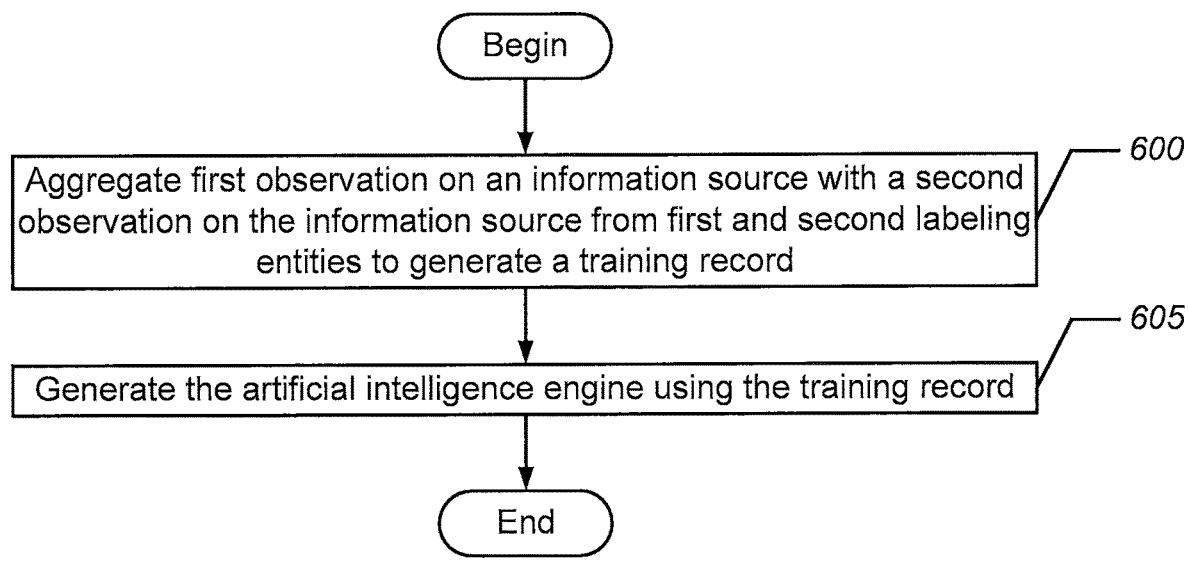

Referring now to FIG. 5, the AI engine 230 is generated using the machine learning engine 220 and one or more updated records in the database 160 containing one or more observations from the labeling entities 110a, 110b, and 110c. As multiple labeling entities 110a, 110b, and 110c ma provide respective observations on the same information source, the machine learning engine 220 may combine these observations into an annotated observation for the record for use in training the AI engine 230. Referring now to FIG. 6, operations begin at block 600 where observations from first and second labeling entities are aggregated into an annotated observation to generate a training record containing the annotated observation. The aggregation of the observations may be performed by determining a consensus among multiple observations from different labeling entities 110a, 110b, and 110c for an information source. In some embodiments, the observations may be weighted based on the identities of the labeling entities 110a, 110b, and 110c when determining a consensus. For example, if one labeling entity 110a, 110b, and 110c is considered an expert in the subject matter of an information source, then that entity's observation could be duplicated multiple times so the observation has a greater impact on final consensus observation to be promoted for use as an annotation in the training record. At block 605, the machine learning engine 220 generates the AI engine 230 using the training record with the one or more annotations for one or more information sources, respectively.

Figure 9:
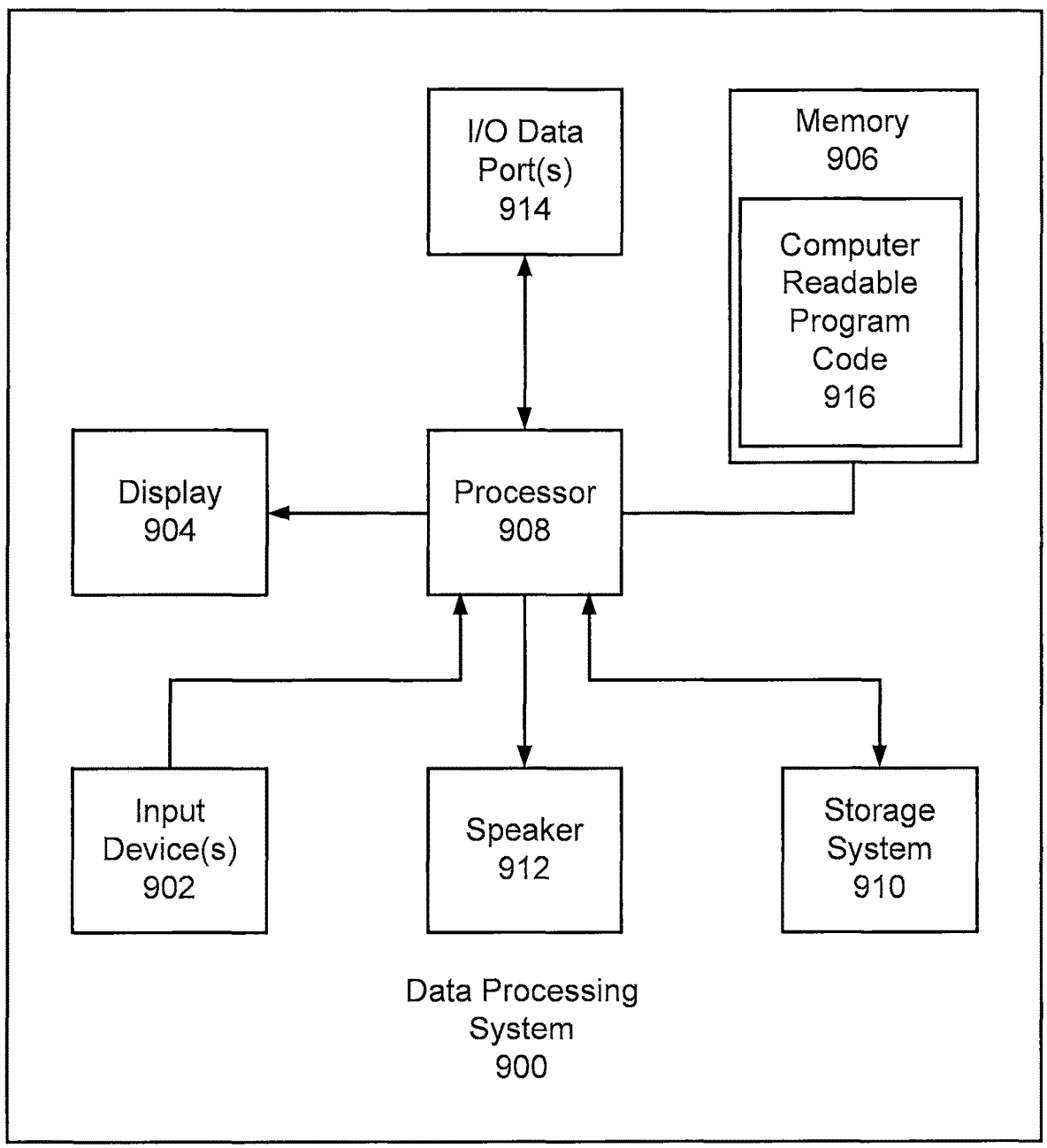
FIG. 9 is a data processing system that may be used to implement one or more servers in the AI labeling platform of FIG. 1 in accordance with some embodiments of the inventive concept.

Referring now to FIG. 9, a data processing system 900 that may be used to implement the batch manager interface server 130 and/or AI system server of FIG. 1, in accordance with some embodiments of the inventive concept, comprises input device(s) 902, such as a keyboard or keypad, a display 904, and a memory 906 that communicate with a processor 908. The data processing system 900 may further include a storage system 910, a speaker 912, and an input/output (I/O) data port(s) 914 that also communicate with the processor 908. The processor 908 may be, for example, a commercially available or custom microprocessor. The storage system 910 may include removable and/or fixed media, such as floppy disks, ZIP drives, hard disks, or the like, as well as virtual storage, such as a RAMDISK. The I/O data port(s) 914 may be used to transfer information between the data processing system 900 and another computer system or a network (e.g., the Internet). These components may be conventional components, such as those used in many conventional computing devices, and their functionality, with respect to conventional operations, is generally known to those skilled in the art. The memory 906 may be configured with computer readable program code 916 to facilitate AI labeling for secure data including observation validation according to some embodiments of the inventive concept.

Figure 10:
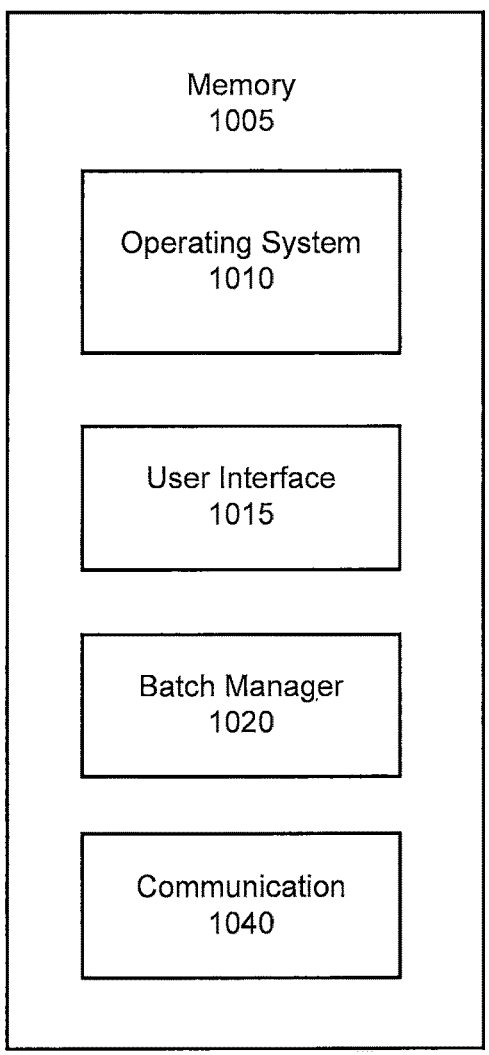
FIG. 10 is a block diagram that illustrates a software/hardware architecture for use in the batch manager interface server of FIG. 1 in accordance with some embodiments of the inventive concept.

FIG. 10 illustrates a memory 1005 that may be used in embodiments of data processing systems, such as the batch manager interface server 130 of FIG. 1 and the data processing system 900 of FIG. 9, respectively, to facilitate AI labeling for secure data including observation validation according to some embodiments of the inventive concept. The memory 1005 is representative of the one or more memory devices containing the software and data used for facilitating operations of the batch manager interface server 130 and the batch manager interface module 135 as described herein. The memory 1005 may include, but is not limited to, the following types of devices: cache, ROM, PROM, EPROM, EEPROM, flash, SRAM, and DRAM. As shown in FIG. 10, the memory 1005 may contain four or more categories of software and/or data: an operating system 1010, a user interface module 1015, a batch manager module 1020, and a communication module 1040. In particular, the operating system 1010 may manage the data processing system's software and/or hardware resources and may coordinate execution of programs by the processor. The user interface module 1015 may be configured to perform one or more of the operations described above with respect to the batch manager interface server 130, the batch manager interface module 135, the flowcharts of FIGS. 3-6, and the database models of FIGS. 7 and 8. The batch manager module 1020 may be configured to perform one or more of the operations described above with respect to the AI system server 140, the AI system module 145, the machine learning engine 220, the AI engine 230, the flowcharts of FIGS. 3-6, and the database models of FIGS. 7 and 8. The communication module 1040 may be configured to support communication between, for example, the branch manager interface server 130 and the AI system server 140, labeling entities 110a, 110b, and 110c, and/or the database 160.

Figure 11:
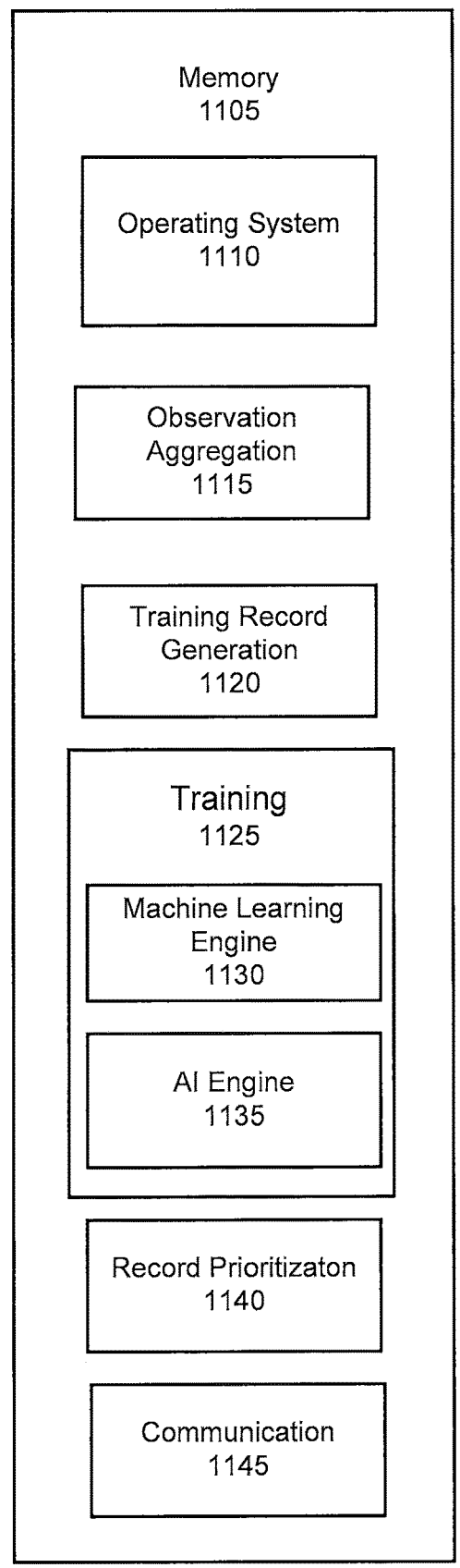
FIG. 11 is a block diagram that illustrates a software/hardware architecture for use in the AI system server of FIG. 1 in accordance with some embodiments of the inventive concept.

FIG. 11 illustrates a memory 1105 that may be used in embodiments of data processing systems, such as the AI system server 140 of FIG. 1 and the data processing system 900 of FIG. 9, respectively, to facilitate AI labeling for secure data including observation validation according to some embodiments of the inventive concept. The memory 1105 is representative of the one or more memory devices containing the software and data used for facilitating operations of the AI system server 130 and the AI system module 145 as described herein. The memory 1105 may include, but is not limited to, the following types of devices: cache, ROM, PROM, EPROM, EEPROM, flash, SRAM, and DRAM. As shown in FIG. 11, the memory 1105 may contain five or more categories of software and/or data: an operating system 1110, an observation aggregation module 1115, a training record generation module 1120, a training module 1125, which includes a machine learning engine module 1130 and an AI engine module 1135, a record prioritization module 1140, and a communication module 1145. In particular, the operating system 1110 may manage the data processing system's software and/or hardware resources and may coordinate execution of programs by the processor. The observation aggregation module may be configured to perform one or more of the operations described above with respect to the AI server 140, the machine learning engine 220, the flowcharts of FIGS. 3-6, and the database models of FIGS. 7 and 8. The training record generation module 1120 may be configured to perform one or more of the operations described above with respect to the AI server 140, the machine learning engine 220, the flowcharts of FIGS. 3-6, and the database models of FIGS. 7 and 8. The machine learning engine module 1130 may be configured to perform one or more of the operations described above with respect to the AI server 140, the machine learning engine 220, the flowcharts of FIGS. 3-6, and the database models of FIGS. 7 and 8. The AI engine module 1135 may be configured to perform one or more of the operations described above with respect to the AI server 140, the AI engine 230, the flowcharts of FIGS. 3-6, and the database models of FIGS. 7 and 8. The record prioritization module 1140 may be configured to perform one or more of the operations described above with respect to the AI server 140, the machine learning engine 220, AI engine 230, the flowcharts of FIGS. 3-6, and the database models of FIGS. 7 and 8. The communication module 1145 may be configured to support communication between, for example, the AI system server 140 and the batch manager interface server 130 and/or the database 160.

Although FIGS. 11-12 illustrate hardware/software architectures that may be used in data processing systems, such as the batch manager interface server 130, AI system server 140 of FIG. 1 and the data processing system 900 of FIG. 9, respectively, in accordance with some embodiments of the inventive concept, it will be understood that embodiments of the present invention are not limited to such a configuration but is intended to encompass any configuration capable of carrying out operations described herein.

Computer program code for carrying out operations of data processing systems discussed above with respect to FIGS. 1-12 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the batch manager interface server 130, the AI system server 140, and the data processing system 900 of FIG. 9 may each be implemented as a single processor system, a multi-processor system, a multi-core processor system, or even a network of standalone computer systems, in accordance with various embodiments of the inventive concept. Each of these processor/computer systems may be referred to as a "processor" or "data processing system."

The data processing apparatus described herein with respect to FIGS. 1-11 may be used to facilitate AI labeling for secure data including observation validation according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 1005 and memory 1105 when coupled to a processor includes computer readable program code that, when executed by the processor, causes the processor to perform operations including one or more of the operations described herein with respect to FIGS. 1-9.

Some embodiments of the inventive concept described herein may provide an AI labeling platform that can protect sensitive data ensuring that the records to be labeled are not exposed to entities that are not authorized to view or access them. Moreover, a validation observation type may be used to improve the accuracy of the labeling process by enlisting other labeling entities to confirm an observation on an ambiguously or possibly incorrectly observed information source in a record. The validating labeling entities may also provide edits to the original label to correct any errors therein. This may allow the observation to be confirmed and used in the training process thereby improving the training of the AI engine and avoiding wasting the effort involved in generating the original observation. It may also allow incorrect observations to be discarded so as not to degrade the training of the AI system. Priorities may be assigned to the records to be assigned to the labeling entities to obtain observations on subject matter areas that the AI engine is the least accurate thereby improving the performance of the training process. This may also lower the cost for creating new AI engines (e.g., new AI models) as fewer records need to be observed to train new models. Likewise the time to create a satisfactory AI engine or AI model may also be reduced as the performance of the AI engine is continually evaluated and the labeling process can stop once a desired performance is achieved.

Further Definitions and Embodiments

In the above description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the

What is claimed is:

1. A computer-implemented method, comprising:
identifying using one or more processors, records in a database for labeling;
verifying, using the one or more processors, that a labeling entity is authorized to view a first one of the records in the database;
presenting, using the one or more processors, the first one of the records in the database to the labeling entity;
receiving using the one or more processors, a first observation on an information source in the first one of the records from the first labeling entity, the first observation having one of a plurality of observation types associated therewith, the plurality of observation types comprising a validation observation type in which the first observation comprises a confirmation of whether a second observation on the information source in the first one of the records from another labeling entity is accurate and an edit for the second observation when the second observation is confirmed as inaccurate;
aggregating the first observation with the second observation to generate an aggregated observation on the information source;
updating, using the one or more processors, the first one of the records in the database with the aggregated observation on the information source;
initiating using the one or more processors and based on the updated first one of the records, training of an Artificial Intelligence (AI) system to generate an AI model;
evaluating, using the one or more processors, an accuracy of the AI model;
prioritizing, using the one or more processors, the records in the database for labeling based on the accuracy of the AI model; and
presenting, using the one or more processors, a second one of the records in the database to the labeling entity based on a priority of the second one of the records in the database.

2. The computer-implemented method of claim 1, wherein the plurality of observation types further comprises a bounding box observation type, a text highlight observation type, a classification observation type, a free text transcription observation type, and/or a meta-information observation type.

3. The computer-implemented method of claim 1, wherein the one of the records comprises data, the information source corresponding to at least a portion of the data in the one of the records;
wherein the data is associated with a regulatory constraint of a governmental administrative authority.

4. The computer-implemented method of claim 3, wherein the data comprises Protected Health Information (PHI); and
wherein the regulatory constraint comprises the Health Insurance Portability and Accountability Act (HIPAA).

5. The computer-implemented method of claim 1, wherein the database is an unstructured database.

6. The computer-implemented method of claim 5, wherein the database is a No SQL database or a UnSQL database; and
wherein the records are in a JavaScript Object Notation (JSON) format.

7. The computer-implemented method of claim 1, wherein the labeling entity is a person.

8. The computer-implemented method of claim 1, wherein the labeling entity is a plurality of persons.

9. The computer-implemented method of claim 1, wherein aggregating the first observation with the second observation comprises:
weighting the first observation and the second observation based on identities of the first labeling entity and the second labeling entity, respectively.

10. A system, comprising:
one or more processors; and
a memory coupled to the one or more processors and comprising computer readable program code embodied in the memory that is executable by the processor to perform operations comprising:
identifying using the one or more processors, records in a database for labeling;
verifying, using the one or more processors, that a labeling entity is authorized to view a first one of the records in the database;
presenting using the one or more processors, the first one of the records in the database to the labeling entity;
receiving using the one or more processors, a first observation on an information source in the first one of the records from the first labeling entity, the first observation having one of a plurality of observation types associated therewith, the plurality of observation types comprising a validation observation type in which the first observation comprises a confirmation of whether a second observation on the information source in the first one of the records from another labeling entity is accurate and an edit for the second observation when the second observation is confirmed as inaccurate;
aggregating the first observation with the second observation to generate an aggregated observation on the information source;
updating using the one or more processors, the first one of the records in the database with the aggregated observation on the information source;
initiating using the one or more processors and based on the updated first one of the records, training of an Artificial Intelligence (AI) system to generate an AI model;
evaluating, using the one or more processors, an accuracy of the AI model;
prioritizing, using the one or more processors, the records in the database for labeling based on the accuracy of the AI model; and
presenting, using the one or more processors, a second one of the records in the database to the labeling entity based on a priority of the second one of the records in the database.

11. The system of claim 10, wherein the plurality of observation types further comprises a bounding box observation type, a text highlight observation type, a classification observation type, a free text transcription observation type, and/or a meta-information observation type.

12. The system of claim 10, wherein the one of the records comprises data, the information source corresponding to at least a portion of the data in the one of the records;
wherein the data is associated with a regulatory constraint of a governmental administrative authority.

13. A computer program product, comprising:
a non-transitory computer readable storage medium comprising computer readable program code embodied in the medium that is executable by one or more processors to perform operations comprising:
identifying using the one or more processors, records in a database for labeling;
verifying, using the one or more processors, that a labeling entity is authorized to view a first one of the records in the database;
presenting using the one or more processors, the first one of the records in the database to the labeling entity;
receiving using the one or more processors, a first observation on an information source in the first one of the records from the first labeling entity, the first observation having one of a plurality of observation types associated therewith, the plurality of observation types comprising a validation observation type in which the first observation comprises a confirmation of whether a second observation on the information source in the first one of the records from another labeling entity is accurate and an edit for the second observation when the second observation is confirmed as inaccurate;
aggregating the first observation with the second observation to generate an aggregated observation on the information source;
updating using the one or more processors, the first one of the records in the database with the aggregated observation on the information source;
initiating using the one or more processors and based on the updated first one of the records, training of an Artificial Intelligence (AI) system to generate an AI model;
evaluating, using the one or more processors, an accuracy of the AI model;
prioritizing, using the one or more processors, the records in the database for labeling based on the accuracy of the AI model; and
presenting, using the one or more processors, a second one of the records in the database to the labeling entity based on a priority of the second one of the records in the database.

14. The computer program product of claim 13, wherein the plurality of observation types further comprises a bounding box observation type, a text highlight observation type, a classification observation type, a free text transcription observation type, and/or a meta-information observation type.

15. The computer program product of claim 13, wherein the one of the records comprises data, the information source corresponding to at least a portion of the data in the one of the records;
wherein the data is associated with a regulatory constraint of a governmental administrative authority.

16. The system of claim 12, wherein the data comprises Protected Health Information (PHI); and
wherein the regulatory constraint comprises the Health Insurance Portability and Accountability Act (HIPAA).

17. The system of claim 10, wherein the database is an unstructured database.

18. The system of claim 17, wherein the database is a NoSQL database or a UnSQL database; and
wherein the records are in a JavaScript Object Notation (JSON) format.

19. The system of claim 10, wherein the labeling entity is a person.

20. The system of claim 10, wherein the labeling entity is a plurality of persons.

* * * * *